United States Patent
De Block et al.

(10) Patent No.: US 6,944,905 B2
(45) Date of Patent: Sep. 20, 2005

(54) WIPER BLADE FOR CLEANING SCREENS IN PARTICULAR ON MOTOR VEHICLES

(75) Inventors: Peter De Block, Halen (BE); Peter Wijnants, Wezemaal (BE)

(73) Assignee: Robert Bosch GmbH, Stuttgart (DE)

( * ) Notice: Subject to any disclaimer, the term of this patent is extended or adjusted under 35 U.S.C. 154(b) by 313 days.

(21) Appl. No.: 10/048,202

(22) PCT Filed: Apr. 4, 2001

(86) PCT No.: PCT/DE01/01304

§ 371 (c)(1), (2), (4) Date: Apr. 22, 2002

(87) PCT Pub. No.: WO01/92073

PCT Pub. Date: Dec. 6, 2001

(65) Prior Publication Data

US 2002/0133897 A1 Sep. 26, 2002

(30) Foreign Application Priority Data

May 29, 2000 (DE) .......................... 100 26 419
Sep. 12, 2000 (DE) .......................... 100 44 913

(51) Int. Cl.$^7$ ................................................ B60S 1/38
(52) U.S. Cl. ............................... 15/250.201; 15/250.43
(58) Field of Search ...................... 15/250.201, 250.43, 15/250.44, 250.361, 250.48

(56) References Cited

U.S. PATENT DOCUMENTS 2,814,820 A    12/1957  Elliott
3,088,155 A *   5/1963  Smithers ................ 15/250.201
3,881,214 A     5/1975  Palu
2003/0014828 A1 * 1/2003 Egner-Walter et al. 15/250.201

FOREIGN PATENT DOCUMENTS

| DE | 1 505 357   |   | 5/1969 |
| DE | 197 36 368 A |  | 2/1999 |
| FR | 2679185     | * | 1/1993 |
| GB | 2 346 318 A |   | 8/2000 |
| WO | 00 340 90 A |   | 6/2000 |
| WO | 01 49537 A  |   | 7/2001 |

* cited by examiner

Primary Examiner—Gary K. Graham
(74) Attorney, Agent, or Firm—Michael J. Striker

(57) ABSTRACT

A wiper blade for cleaning motor vehicles is proposed, which is provided with a band-like, elongated, spring-elastic support element (12). The lower band surface (13) of the support element (12) oriented toward the window (22) has an elongated, rubber-elastic wiper strip (14), which can be placed against the window (22), disposed on it so that the longitudinal axes of these two parts are parallel and the upper band surface (11) of the support element (12) has a wind deflection strip (42) disposed on it, which extends in the longitudinal direction of the support element, is provided with an attack surface (54) oriented toward the main flow of the relative wind, and is comprised of an elastic material. A considerable weight savings for the wiper blade is achieved if the wind deflection strip (42, 142, or 242) has two diverging legs (44, 46), viewed in cross section, which are connected to each other at a common base (48) and whose free ends (50, 52) oriented toward the window (22) are supported on the wiper blade (10), and the attack surface (54) is embodied on the outside of the one leg (44).

19 Claims, 4 Drawing Sheets

WIPER BLADE FOR CLEANING SCREENS IN PARTICULAR ON MOTOR VEHICLES

BACKGROUND OF THE INVENTION

In known wiper blades, the purpose of the support element is to assure as uniform as possible a distribution of the wiper blade pressure against the window, which pressure is exerted by the wiper arm, over the entire wiping field wiped by the wiper blade. Through an appropriate curvature of the unloaded support element—i.e. when the wiper blade is not resting against the window—the ends of the wiper strip, which is placed completely against the window during operation of the wiper blade, are loaded toward the window by the support element, which is stretched in this state, even though the curvature radii of spherically curved vehicle windows change with each wiper blade position. The curvature of the wiper blade must therefore be somewhat sharper than the sharpest curvature measured within the wiping field on the window to be wiped. The support element consequently replaces the expensive support bracket structure with two spring strips disposed in the wiper strip, as is the practice in conventional wiper blades (DE-OS 15 05 357).

The invention is based on a wiper blade. In a known wiper blade of this kind (DE 197 36 368), the wiper blade is provided with a so-called wind-deflection strip so that the airflow-induced tendency of the wiper blade to lift up from the window that occurs at high driving speeds is counteracted by a force component directed toward the window. To this end, the wind-deflection strip has a front side, which is embodied as an attach surface and is acted on chiefly by the relative wind during the reciprocating wiper operation. The cross section of the wind-deflection strip is approximately the shape of a right triangle, whose one leg is oriented toward the support element and whose hypotenuse represents the attach surface. This attach surface encloses an acute angle with the plane of the reciprocating motion of the wiper blade and with the surface of the window. The triangular profile used requires a relatively large amount of material for the manufacture of the wind-deflection strip, which is reflected in the costs for the wiper blade. Moreover, the weight of the wiper blade is considerably increased in an undesirable fashion. Namely, the increased mass, which must be accelerated in the reciprocating wiper operation, requires a more powerful drive unit and a more expensive design of the reciprocating mechanism connected to this drive unit. In addition, the profile-induced rigidity of a wind-deflection strip that is shaped in this way can impair the operating behavior of the support element and/or the wiper blade.

SUMMARY OF THE INVENTION

In the wiper blade according to the invention, the weight of the wind-deflection strip is considerably reduced by the cross sectional embodiment of an angular profile. Moreover, in addition to the savings in material, there is also a reduction of the mass being moved, with the resulting advantages with regard to the design of the drive unit and the reciprocating mechanism. In addition, the rigidity of the wind deflection strip is considerably reduced and as a result, so is its influence on the bending and elastic behavior of the wiper blade support element.

If the wiper blade part of a device, which is for connecting the wiper blade to a reciprocally driven wiper arm, is supported on the upper band surface of the support element in its middle section and an end cap is placed at both ends of the support element, then a simple installation of the wind deflection strip is produced when the strip is comprised of two sections, each of which extends between a respective end cap and the device piece.

In a modification of the invention, the profile of the cross section is the same over the entire length of the wind deflection strip. As a result, it can be manufactured in a particularly inexpensive manner using the extrusion process.

In a modification of the invention, the two legs of the wind deflection strip are connected to each other by a wall in the vicinity of the two wiper blade ends. With the use of a wind deflection strip of this kind, which is to be manufactured in an injection mold, the end caps to be placed at the ends of the support element or the wiper blade can be eliminated because this wall constitutes the end of the wind deflection strip. Furthermore, a wind deflection strip manufactured in this way can be arbitrarily shaped. It can also easily adapt to arbitrary shapes of the support element, for example when the support element has a cross sectional reduction in the longitudinal direction from the middle region toward the ends.

It is also possible to embody the tapering of the cross section of the wind deflection strip toward its ends in accordance with stylistic considerations. Thus on the one hand, it can be useful if the wall is aligned essentially perpendicular to the support element.

On the other hand, an attractively formed end of the wind deflection strip can also be achieved through a correspondingly oblique alignment of the wall in which an outside of the wall encloses an acute angle $\alpha$ with the support element. It goes without saying that each of the two ends of two sections belonging to a wind deflection strip can be embodied differently in accordance with the measures outlined above.

In certain applications, in order to simplify installation of the wiper blade, it can be advantageous if the wall is provided with a recess, which is open at the edge toward the window and whose width is greater than the depth of wiper strip in the vicinity of the support element and whose depth reaches to the upper band surface of the support element.

An operationally reliable support of the wind deflection strip on the wiper blade is achieved through attachment of the leg ends to the wiper blade.

Such an attachment to the wiper blade can be easily and inexpensively achieved by means of a glued attachment.

If the free leg ends of the wind deflection strip are attached, preferably glued, to the support element of the wiper blade, this assures a precise positioning of the wind deflection strip on the wiper blade.

The positioning is further improved if in the embodiment of the concept of the invention, the free leg ends of the wind deflection strip are provided, at least in sections, with claw-like projections, which encompass the mutually opposed outer edge strips of the support element.

When using wind deflection strips, which are provided with the above-mentioned end walls, it is useful if the claw-like projections extend from the leg ends into the vicinity of the wall and suitably encompass end regions of the support element.

The claw-like projections, which are used as positioning aids, offer particularly advantageous regions for the glued attachment.

For a particularly stable, operationally reliable attachment of the wind deflection strip to the support element, the claw surface disposed on the upper band surface of the support element has a greater width than the claw surface engaging the lower band side.

The attack surface of the wind deflection strip is suitably embodied as a flute on the outer wall of the one leg.

In order to avoid an unfavorable flow progression of the relative wind sweeping past the wiper blade in the vicinity of the wiper blade ends, the end caps are provided with a flute, which extends in the projection of the flute of the wind deflection strip.

In order to counteract this disadvantage in the middle section of the wiper blade as well, the wiper blade part of the connecting device is provided with a flute, which extends in the projection of the flute of the wind deflection strip.

So that the distribution of the wiper blade pressure against the window by means of the individually designed support element is not significantly influenced by the wind deflection strip, the hardness of the material for the wind deflection strip is at most 40 percent greater than the hardness of the material for the wiper strip.

In this connection, it is particularly advantageous if the hardness of the material for the wind deflection strip is at most 20 percent greater than the hardness of the material for the wiper strip.

In many instances, it has turned out to be advantageous if the wiper strip has a Shore hardness A of between 64 and 71 and the wind deflection strip has a Shore hardness A of between 70 and 78.

Other advantageous modifications and embodiments of the invention are disclosed in the following description of exemplary embodiments shown in the accompanying drawings.

DETAILED DESCRIPTION OF THE PREFERRED EMBODIMENTS

Figure 1:
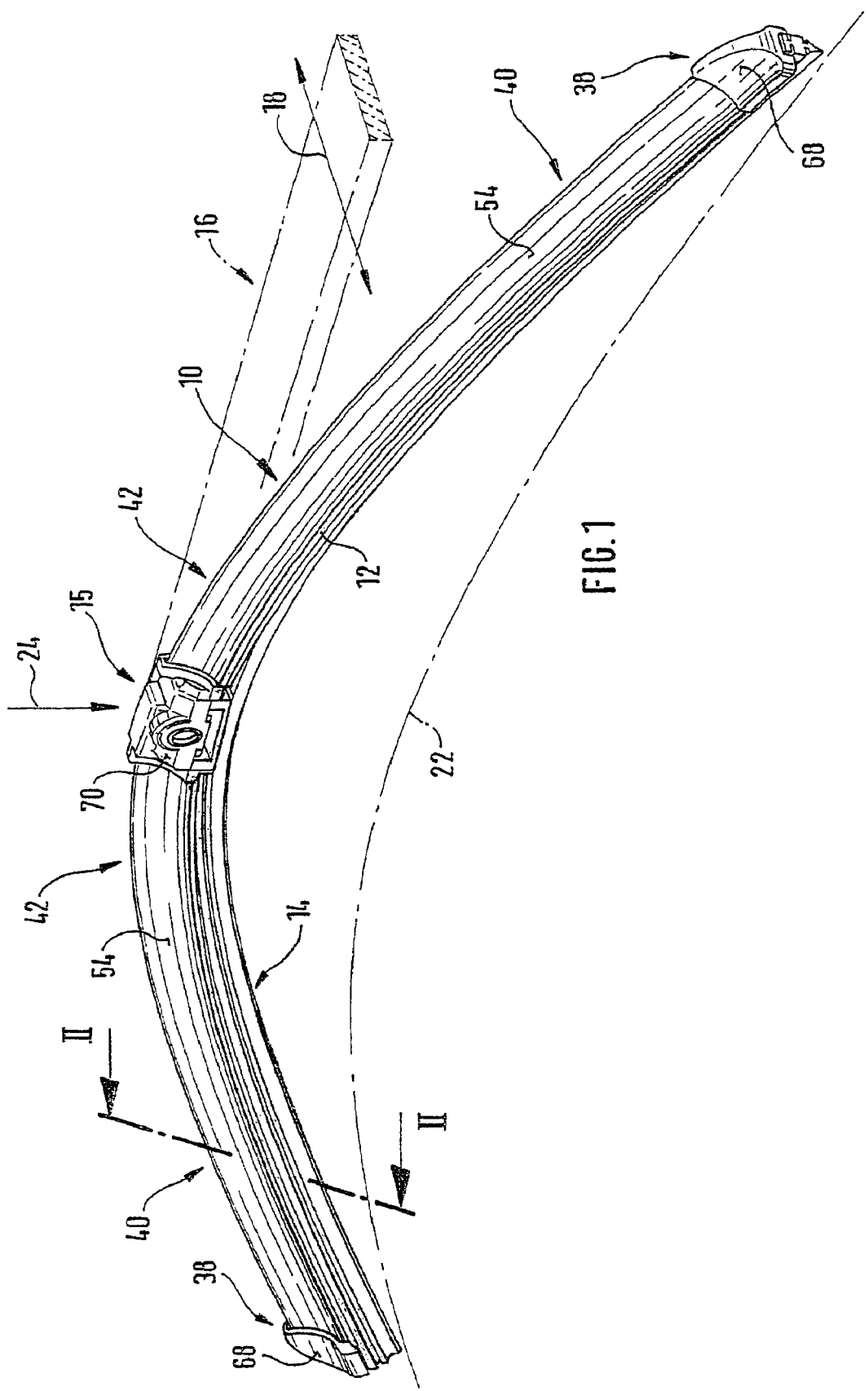
FIG. 1 is a perspective representation of a wiper blade according to the invention, with the wiper arm indicated with dot-and-dash lines.

A wiper blade 10 shown in FIG. 1 has a band-like, elongated, spring-elastic support element 12 (FIGS. 1 and 2), whose lower band side 13 oriented toward the window has an elongated, rubber-elastic wiper strip 14 attached to it so that the longitudinal axes of these two parts are parallel. On the upper band side 11 of the support element 12, which is oriented away from the window, which support element is also referred to as a spring strip, the middle section of the support element is provided with the wiper blade part 15 of a connecting device, with the aid of which the wiper blade 10 can be detachably connected in an articulating fashion to a wiper arm 16 indicated with dot-and-dash lines in FIG. 1. The wiper arm 16, which is driven to reciprocate in the direction of a double arrow 18 in FIG. 1, is loaded in the direction of an arrow 24 toward the window to be wiped, for example the windshield of a motor vehicle, whose surface is indicated with a dot-and-dash line 22 in FIG. 1. Since the line 22 is intended to represent the sharpest curvature of the window surface, it is clear that the curvature of the wiper blade, which is not yet under tension and rests with both of its ends against the window, is sharper than the maximal window curvature (FIG. 1). As a result of the pressure (arrow 24), the wiper blade 10 rests with its wiper lip 26 against the window surface 22 over its entire length. This causes a tension to be built up in the spring-elastic metal support element 12, which assures a uniform contact of the wiper strip 14 and the wiper lip 26 over its entire length against the window surface 22 and assures a uniform distribution of the pressure (arrow 24).

The particular embodiment of the wiper blade according to the invention will now be discussed in detail.

Figure 2:
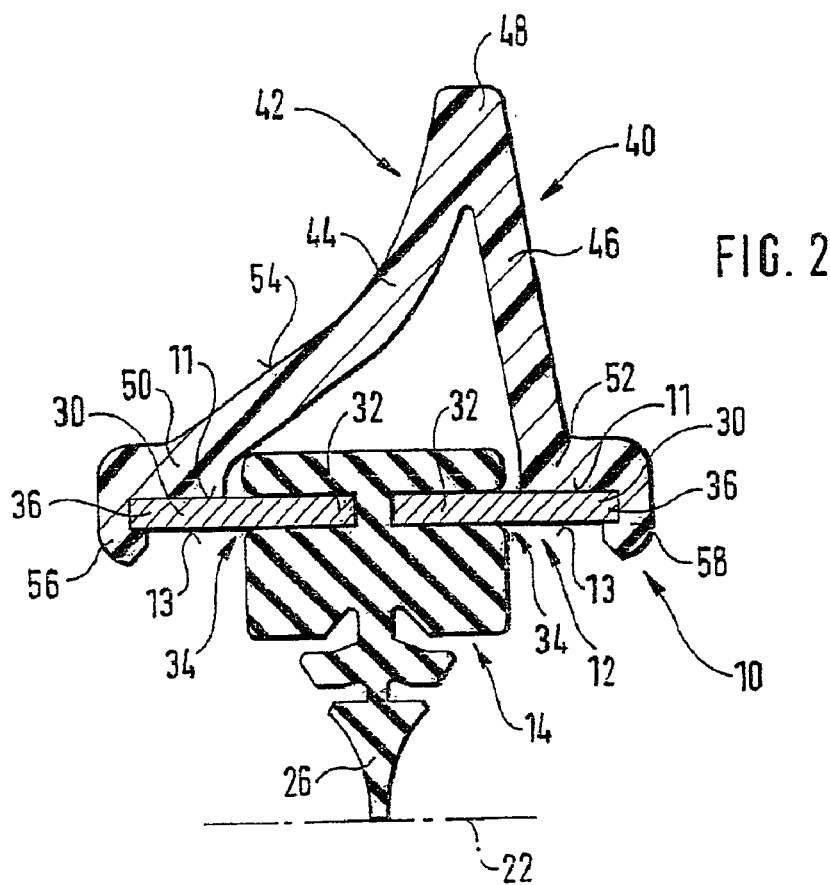
FIG. 2 shows an enlarged cross section through the wiper blade along the line II—II in FIG. 1.

FIG. 2 shows that the support element 12 in the exemplary embodiment has two spring strips 30, which are disposed in a common plane approximately parallel to the window surface 22. The two spring strips 30 protrude with their mutually opposed inner edge strips 32 into longitudinal grooves 34 of the wiper strip 14, which are open at the edges, and protrude from these longitudinal grooves 34 with external edge strips 36. The two spring strips 30 are secured in their longitudinal grooves 34 by the part 15 of the connecting device in the middle region of the wiper blade and by end caps 38 disposed at each end of the wiper blade. To this end, these components 15 and 38 encompass the outer edge strips 36 of the spring strips 30. Sections 40 of a wind deflection strip 42 are respectively disposed between the part 15 and each of the two end caps 38. The disposition of the wind deflection strip 42 and its embodiment can be inferred from FIGS. 2 and 3. The wind deflection strip 42 comprised of an elastic material, for example a plastic, and its two sections 40 rest against the upper band side 11 of the support element 12. Viewed in cross section, the wind deflection strip 42 has two diverging legs 44 and 46, which are connected to each other by a common base 48. The free ends 50 and 52 of the legs 44 and 46 are oriented toward the window 22 and are supported against the wiper blade 10 or its support element 12. An attack surface 54, which is fluted in the exemplary embodiment, is embodied on the outside of the one leg 44 and the relative wind chiefly flows against this attack surface 54 during operation of the wiper device. The cross sectional form of the wind deflection strip 42 and/or of its sections 40 shown in FIGS. 2 and 4 is the same over the entire length so that these sections can be inexpensively extruded. At their free leg ends 50 and 52, the sections 40 of the wind deflection strip 42 are attached to the wiper blade and/or to its support element 12. Suitably, the free leg ends of the wind deflection strip 42 are glued to the support element 12 of the wiper blade 10. To that end, the free ends 50 and 52 of the legs 44 and 46 are provided with claw-like projections 56, 58, which suitably encompass the mutually opposed outer edge strips 36 of the support element 12. The surfaces of the claw-like projections 56, 58 resting against the edge strips 36 serve as gluing surfaces with which the sections 40 of the wind deflection strip 42 are glued to the support element. For a particularly stable glued attachment, the claw surfaces 60 resting against the upper band side 11 of the support element 12 (FIG. 3) have a greater width 62 than the claw surfaces 64 engaging the lower band surface 13, whose width is labeled with the reference numeral 66 in FIG. 3. It can be inferred from FIG. 1 that the fluted attack surface 54 of the sections 40 also extends on the end caps 38 and on the part 15 of the connecting device. The fluting of the end caps 38 is labeled with the reference numeral 68 in FIG. 1, while the fluting of the component 15 is provided with the reference numeral 70. The wind deflection strip 42 or its sections 40 have a cross section that remains uniform over its entire length so that it can be inexpensively extruded.

Figure 4:
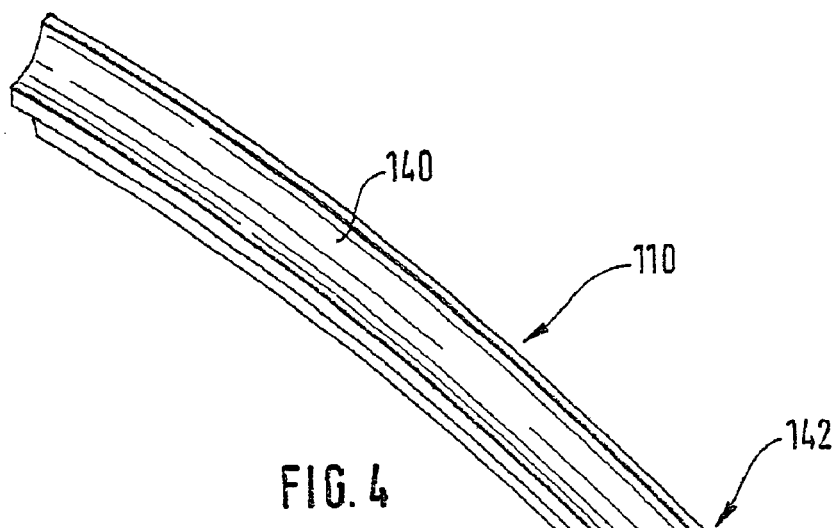
FIG. 4 is a partial depiction according to FIG. 1 of a differently embodied wiper blade according to the invention.
Figure 5:
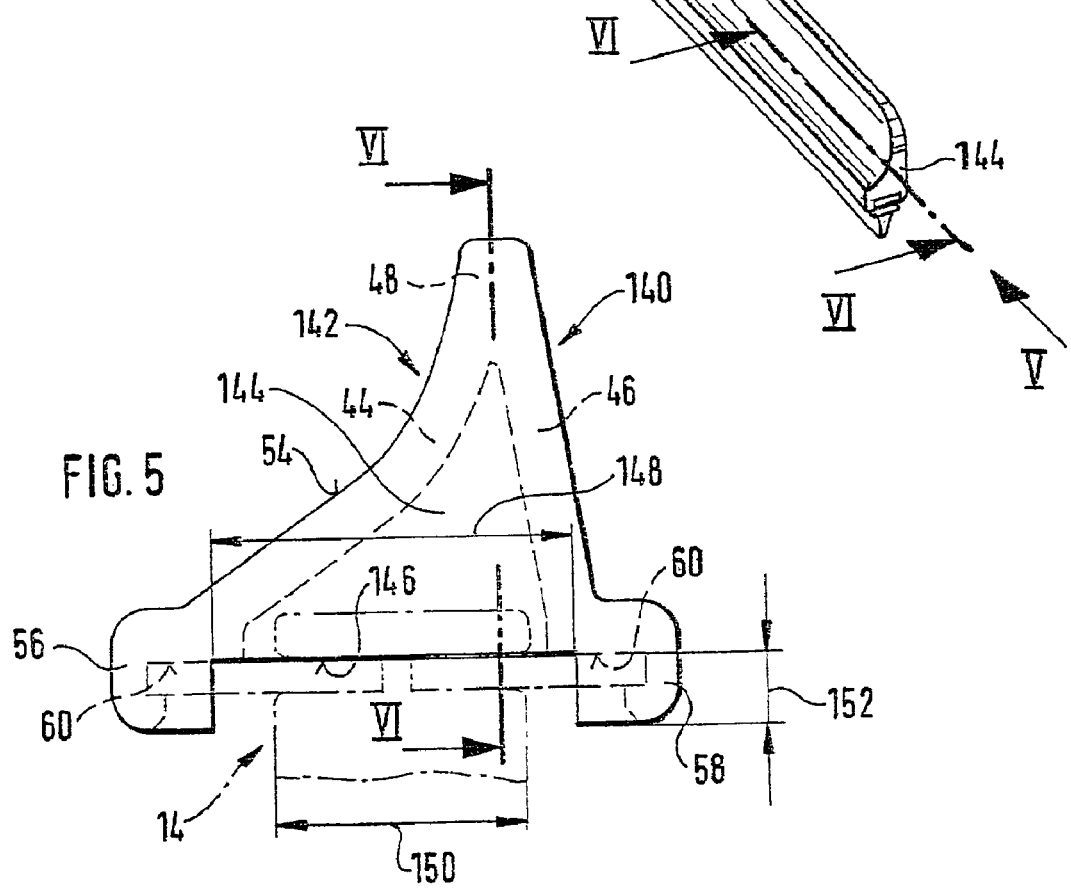
FIG. 5 shows an enlarged view of the wiper blade according to FIG. 4, viewed in the direction of the arrow V.
Figure 6:
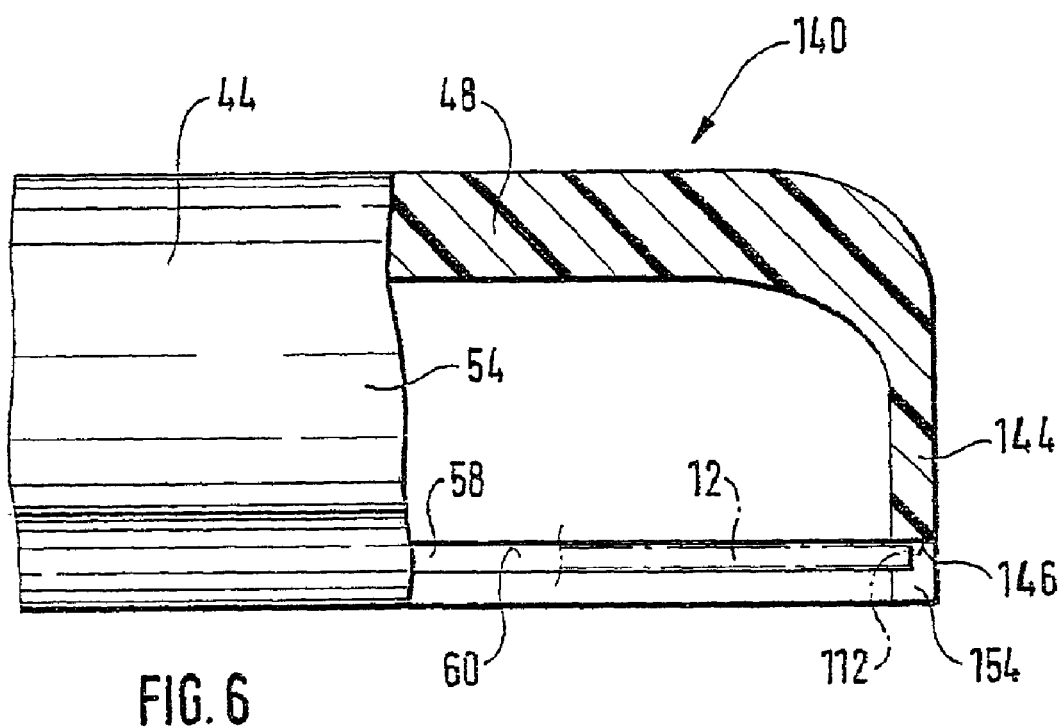
FIG. 6 shows an enlarged partial section along the line IV—IV through the end of the wind deflection strip associated with the wiper blade according to FIG. 4, whose position is clarified in FIG. 5 by a line VI—IV.

FIGS. 4 to 6 show another embodiment of the wiper blade 110 according to the invention. Since the deviations from the wiper blade 10 relate solely to the wind deflection strip, FIG. 4 shows only a section of the wiper blade 110, which reaches from one end to the part 15 of the connecting device, which part is no longer depicted. The design of the wind deflection strip 142 associated with the wiper blade 110 corresponds to the exemplary embodiment described above insofar as its attachment to the support element 12 at the outer edge strips 36 of the support element spring strips 30 is concerned, so that the attendant details need not be discussed further. Therefore, the reference numerals that have been indicated in the embodiment described above will also be used below for the embodiments of the wind deflection strip 142 that have already been explained. Viewed in cross section, the wind deflection strip 142 likewise has two legs 44, 46, which are connected to each other at a common base 48. The free ends 50 and 52 of the legs 44 and 46 are likewise provided with claw-like projections 56 and 58, which suitably encompass the outer edge strips 36 of the spring strips 30. In this exemplary embodiment as well, the two sections 140 of the wind deflection strip 142, which are produced in an injection molding die, are glued to the support element 12 of the wiper blade 10. The claw-like projections permit the wind deflection strip to be simply clipped onto the support element and thus permit a precise positioning for the gluing process. Also, the glue points reliably overlap each other. In addition, a fluted attack surface 54 is likewise embodied on the leg 44 of the wind deflection strip 142 or on its sections 140 (FIG. 5).

Figure 3:
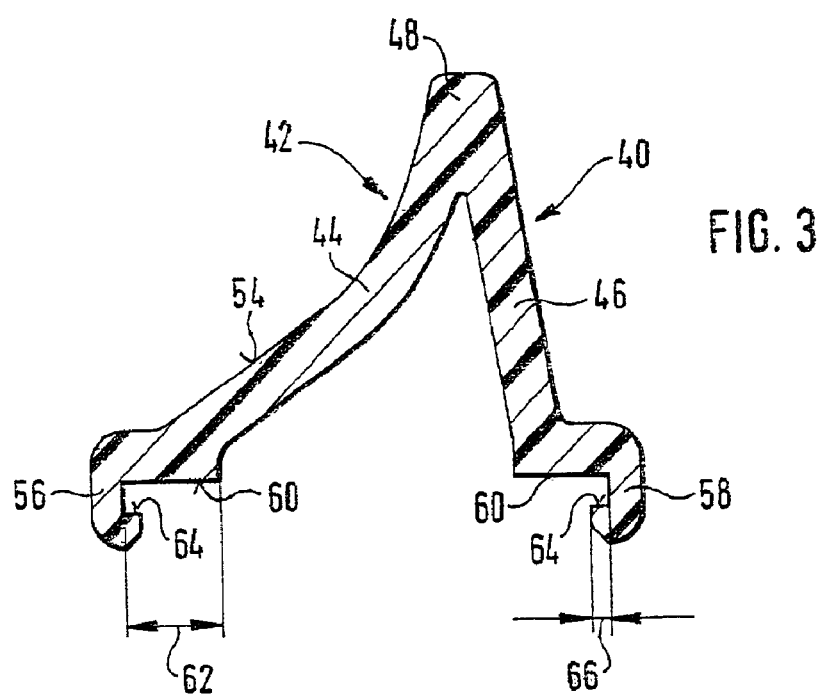
FIG. 3 shows the cross section according to FIG. 2 through the wind deflection strip associated with the wiper blade, without the wiper strip and the support element.

Diverging from the exemplary embodiment according to FIGS. 1 to 3, the two legs 44 and 46 are connected to each other by means of a wall 144 at the wiper blade ends and at the ends of the sections 140 disposed there, which wall extends from the base 48 to the claw-like projections 56, 58. The wall 144 is aligned essentially perpendicular to the support element 12 and to the claw-like projections 56, 58 encompassing it.

As FIGS. 5 and 6 show, the wall 144 is provided with a recess 146, which is open at the edge oriented toward the window and whose width 148 is greater than the width 150 of the wiper strip 14 indicated with dot-and-dash lines in FIG. 5. The depth 152 of the recess 146 reaches to the upper band surface 11 of the support element 12. This can be conceptualized on the basis of the upper claw surface 60 in FIG. 5, which when the wind deflection strip is glued to the support element, rests against the upper band side 11 of the support element 12 or against the top of its spring strips 30. It can also be inferred from FIG. 6 that the claw-like projections extend from the ends of the legs 44, 46, into the vicinity of the wall 144 and suitably encompass the end regions 112 of the support element 12, which are indicated with dot-and-dash lines. In FIG. 6, the claw-like projection of the wall 144 of the section 140 has been labeled with the reference numeral 154. The claw-like projections 56, 58 in the exemplary embodiments according to FIGS. 1 to 3 and 4 to 6 are also used to cover the sharp, free end edges of the support element 12 and are used as a reliable placement aid for the sections 40 and 140 when they are glued to the support element 12.

Figure 7:
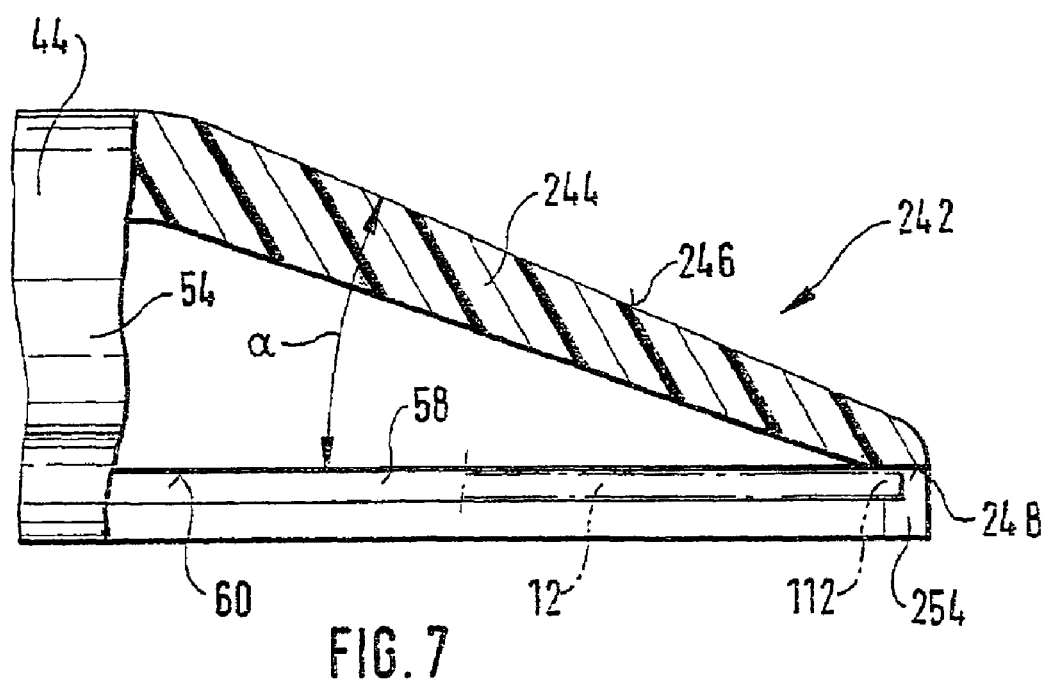
FIG. 7 shows a section according to FIG. 6 through another embodiment of a wind deflection strip associated with the wiper blade according to the invention.

FIG. 7 shows an alternative disposition of the wall 144 (FIG. 6). The wall 244 situated in the end region of the wind deflection strip 242 is disposed so that its outside 246 encloses an acute angle α with the support element 12. This can be conceptualized on the basis of the claw-like projection 58, which encompasses the support element when the wind deflection strip 242 is connected to it and rests with its claw surface 60 against the upper band side 11 of the support element 12. Also in this embodiment, the wall 244 and/or its claw-like projection 254 is provided with a recess 248, which corresponds in its disposition and dimensions to the recess 146 according to the embodiment in FIGS. 4 to 6. FIG. 7 also shows that claw-like projections 254 are likewise disposed on the wall 244, which suitably encompass end regions 112 of the support element 12 that is indicated with dot-and-dash lines.

So that the desired properties of the wiper blade are not influenced to an impermissible degree by the design of the support element, the hardness of the material for the wind deflection strip 42 is at most 40% greater than the hardness of the material for the wiper strip 14. It is particularly advantageous to limit this value to 20%. In practice, it has turned out that the most favorable results with regard to the wiping quality over a broad vehicle speed range are achieved if the wiper strip 14 has a Shore hardness A of 68 and the wind deflection strip 42 has a Shore hardness A of 72.

In this connection, the thickness of the legs 44 and 46 is also of particular importance in the matching of the selected hardness of the materials for the wind deflection strip and the wiper strip.

All of the exemplary embodiments share the common trait that the wind deflection strip 42, 142, or 242 has two diverging legs 44 and 46, viewed in cross section, which are connected to each other at a common base 48 and whose free ends 50 and 52, which are oriented toward the window 22, are supported on the wiper blade 10, where the outflow surface 54 is embodied on the outside of the one leg 44.

By contrast to the exemplary embodiments described above, though, instead of the wind deflection strip 42 having two sections 40, it is also conceivable for it to be made up of one piece that extends over and covers the device part 15. Naturally, in this case, the wind deflection strip must have at least one appropriate recess, which permits the articulating connection between the wiper arm and the wiper blade.

It is also conceivable that due to particular criteria, it can be quite useful for the wiper blade according to FIG. 1 or FIG. 4 to be provided with only one section 40 or 140 of the wind deflection strip, which is fastened to the wiper blade either in its region close to the reciprocation axis or its region remote from this axis.

What is claimed is:

1. A wiper blade for cleaning windows, comprising:
a band-like, elongated, spring-elastic support element (12), wherein a lower band surface (13) of the support element oriented toward the window (22) has an elongated, rubber-elastic wiper strip (14), disposed on it so that the longitudinal axes of these two parts are parallel, wherein the wiper strip can be placed against a window, and wherein an upper band surface (11) of the support element (12; 30, 30) has a wind deflection strip (42) disposed on it, which extends in the longitudinal direction of the support element (12), is provided with an attack surface (54) oriented toward the main flow of the relative wind, and is made of an elastic material, wherein the wind deflection strip (42, 142, 242) has two diverging legs (44, 46), viewed in transverse cross section, wherein the two diverging legs are connected to each other at a common base (48) and wherein free ends of the two diverging legs oriented toward the window (22) are supported on the support element of the wiper blade (10), and the attack surface (54) is embodied on the outside of the one leg (44) above the support element, and the legs (44, 46) form therebetween an angular hollow space that expands from an upper narrowest point of the base downwardly to the upper band surface of the support element (12; 30, 30) and are in contact with the upper band surface (11) of the support element said legs contacting the upper band surface at a location laterally spaced from said rubber-elastic wiper strip.

2. The wiper blade according to claim 1, wherein the profile of the cross section is the same over the entire length of the wind deflection strip (42).

3. The wiper blade according to claim 1, wherein the two legs (44, 48) of the wind deflection strip (142 or 242) are connected to each other by means of a wall (144 or 244) in the vicinity of the two wiper blade ends.

4. The wiper blade according to claim 3, wherein the wall (144) is aligned essentially perpendicular to the support element (12).

5. The wiper blade according to claim 3, wherein the outside (246) of the wall (244) encloses an acute angle (a) with the support element (12).

6. The wiper blade according to claim 1, wherein the free leg ends (50, 52) of the wind deflection strip (42, 142, or 242) are glued to the support element.

7. The wiper blade according to claim 1, wherein the free leg ends (50, 52) of the wind deflection strip (42, 142, or 242) are attached, preferably glued, to the support element (12) of the wiper blade (10).

8. The wiper blade according to claim 1, wherein the free leg ends (50, 52) of the wind deflection strip (42, 142, or 242), at least in sections, are provided with claw-like projections (56, 58), which suitably encompass the mutually opposed outer edge strips (36) of the support element (12).

9. The wiper blade according to claim 8, wherein a glued attachment is produced in the vicinity of the claw-like projections (56, 58).

10. The wiper blade according to claim 1, wherein the attack surface (54) of the wind deflection strip (42, 142, or 242) is embodied as a flute on the outer wall of the one leg (44).

11. The wiper blade according to claim 1, wherein a hardness of the material for the wind deflection strip (42) is at most 40 percent greater than the hardness of the material for the wiper strip (14).

12. The wiper blade according to claim 1, wherein a hardness of the material for the wind deflection strip (42, 142, or 242) is at most 20 percent greater than the hardness of the material for the wiper strip (14).

13. A wiper blade for cleaning windows, comprising:
a band-like, elongated, spring-elastic support element (12), wherein a lower band surface (13) oriented toward the window (22) has an elongated, rubber-elastic wiper strip (14), which can be placed against the window, disposed on it so that the longitudinal axes of these two parts are parallel and wherein an upper band surface (11) of the support element has a wind deflection strip (42) disposed on it, wherein the wind deflection strip extends in a longitudinal direction of the support element (12), is provided with an attack surface (54) oriented toward the main flow of the relative wind, and is made of an elastic material, wherein the wind deflection strip (42, 142, 242) has two diverging legs (44, 46), viewed in transverse cross section, wherein the two diverging legs are connected to each other at a common base (48) and wherein free ends of the two diverging legs oriented toward the window (22) are supported on the support element, and the attack surface (54) is embodied on the outside of the one leg (44), wherein the upper band surface (11) of the support element (12), in its middle section, includes a wiper blade part (15) for connecting the wiper blade (10) to a reciprocally driven wiper arm (16) and is supported, wherein an end cap (38) is respectively disposed at both ends of the support element (12), and wherein a section (40) of the wind deflection strip (42) is disposed between and in contact with each respective end cap (38) and the device piece (15).

14. A wiper blade for cleaning windows, comprising:
a band-like, elongated, spring-elastic support element (12), whose lower band surface (13) oriented toward the window (22) has an elongated, rubber-elastic wiper strip (14), which can be placed against the window, disposed on it so that the longitudinal axes of these two parts are parallel and whose upper band surface (11) has a wind deflection strip (42) disposed on it, which extends in the longitudinal direction of the support element (12), is provided with an attack surface (54) oriented toward the main flow of the relative wind, and is made of an elastic material, wherein the wind deflection strip (42, 142, 242) has two diverging legs (44, 46), viewed in transverse cross section, which are connected to each other at a common base (48) and whose free ends oriented toward the window (22) are supported on the support element, and the attack surface (54) is embodied on the outside of the one leg (44), wherein the two legs (44, 46) of the wind deflection strip (142 or 242) are connected to each other by means of a wall (144 or 244) in the vicinity of the two wiper blade ends, and wherein the wall (144 or 244) is provided with a recess (146 or 246) that is open at the edge oriented toward the window (22), wherein the width (148) of this recess is greater than the width (150) of the wiper strip (14) in a vicinity of the support element and its depth (152) reaches to the upper band surface (11) of the support element (12).

15. A wiper blade for cleaning windows, comprising
a band-like, elongated, spring-elastic support element (12), whose lower band surface (13) oriented toward the window (22) has an elongated, rubber-elastic wiper strip (14), which can be placed against the window, disposed on it so that the longitudinal axes of these two parts are parallel and whose upper band surface (11) has a wind deflection strip (42) disposed on it, which extends in the longitudinal direction of the support element (12), is provided with an attack surface (54) oriented toward the main flow of the relative wind, and is made of an elastic material, wherein the wind deflection strip (42, 142, 242) has two diverging legs (44, 46), viewed in transverse cross section, which are connected to each other at a common base (48) and whose free ends oriented toward the window (22) are supported on the wiper blade (10), and the attack surface (54) is embodied on the outside of the one leg (44), wherein the free leg ends (50, 52) of the wind deflection strip (42, 142, or 242), at least in sections, are provided with claw-like projections (56, 58), which suitably encompass the mutually opposed outer edge strips (36) of the support element (12), and wherein the claw-like projections extend from the leg ends (50, 52) into a vicinity of a wall (154 or 254), and suitably encompass end regions (112) of the support element (12).

16. A wiper blade for cleaning windows, comprising:

a band-like, elongated, spring-elastic support element (12), whose lower band surface (13) oriented toward the window (22) has an elongated, rubber-elastic wiper strip (14), which can be placed against the window, disposed on it so that the longitudinal axes of these two parts are parallel and whose upper band surface (11) has a wind deflection strip (42) disposed on it, which extends in the longitudinal direction of the support element (12), is provided with an attack surface (54) oriented toward the main flow of the relative wind, and is made of an elastic material, wherein the wind deflection strip (42, 142, 242) has two diverging legs (44, 46), viewed in transverse cross section, which are connected to each other at a common base (48) and whose free ends oriented toward the window (22) are supported on the support element, and the attack surface (54) is embodied on the outside of the one leg (44), wherein the free leg ends (50, 52) of the wind deflection strip (42, 142, or 242), at least in sections, are provided with claw-like projections (56, 58), which suitably encompass the mutually opposed outer edge strips (36) of the support element (12), and wherein the claw surfaces (60) resting against the upper band surface (11) of the support element (12) have a greater width (62) than the claw surfaces (64) engaging the lower band side (13).

17. A wiper blade for cleaning windows, comprising:

a band-like, elongated, spring-elastic support element (12), whose lower band surface (13) oriented toward the window (22) has an elongated, rubber-elastic wiper strip (14), which can be placed against the window, disposed on it so that the longitudinal axes of these two parts are parallel and whose upper band surface (11) has a wind deflection strip (42) disposed on it, which extends in the longitudinal direction of the support element (12), is provided with an attack surface (54) oriented toward the main flow of the relative wind, and is made of an elastic material, wherein the wind deflection strip (42, 142, 242) has two diverging legs (44, 46), viewed in transverse cross section, which are connected to each other at a common base (48) and whose free ends oriented toward the window (22) are supported on the support element, and the attack surface (54) is embodied on the outside of the one leg (44), wherein the upper band surface (11) of the support element (12), in its middle section, the wiper blade part (15) of a device, which is for connecting the wiper blade (10) to a reciprocally driven wiper arm (16), is supported, wherein an end cap (38) is respectively disposed at both ends of the support element (12), wherein a section (40) of the wind deflection strip (42) is disposed between each respective end cap (38) and the device piece (15), and wherein the end caps (38) are provided with a flute (68), which extends in a projection of the flute of the attack surface (54) of the wind deflection strip.

18. A wiper blade for cleaning windows, comprising:

a band-like, elongated, spring-elastic support element (12), whose lower band surface (13) oriented toward the window (22) has an elongated, rubber-elastic wiper strip (14), which can be placed against the window, disposed on it so that the longitudinal axes of these two parts are parallel and whose upper band surface (11) has a wind deflection strip (42) disposed on it, which extends in the longitudinal direction of the support element (12), is provided with an attack surface (54) oriented toward the main flow of the relative wind, and is made of an elastic material, wherein the wind deflection strip (42, 142, 242) has two diverging legs (44, 46), viewed in transverse cross section, which are connected to each other at a common base (48) and whose free ends oriented toward the window (22) are supported on the support element, and the attack surface (54) is embodied on the outside of the one leg (44), wherein the upper band surface (11) of the support element (12), in its middle section, the wiper blade part (15) of a device, which is for connecting the wiper blade (10) to a reciprocally driven wiper arm (16), is supported, wherein an end cap (38) is respectively disposed at both ends of the support element (12), and wherein a section (40) of the wind deflection strip (42) is disposed between each respective end cap (38) and the device piece (15), and the wiper blade part (15) of the connecting device is provided with a flute (70), which extends in a projection of the flute of the attack surface (54) of the wind deflection strip (42).

19. A wiper blade for cleaning windows, comprising:

a band-like, elongated, spring-elastic support element (12), whose lower band surface (13) oriented toward the window (22) has an elongated, rubber-elastic wiper strip (14), which can be placed against the window, disposed on it so that the longitudinal axes of these two parts are parallel and whose upper band surface (11) has a wind deflection strip (42) disposed on it, which extends in the longitudinal direction of the support element (12), is provided with an attack surface (54) oriented toward the main flow of the relative wind, and is made of an elastic material, wherein the wind deflection strip (42, 142, 242) has two diverging legs (44, 46), viewed in transverse cross section, which are connected to each other at a common base (48) and whose free ends oriented toward the window (22) are supported on the support element, and the attack surface (54) is embodied on the outside of the one leg (44), and wherein the wiper strip (14) has a Shore hardness A of between 64 and 71, in particular 68, and the wind deflection strip (42) has a Shore hardness A greater than the wiper strip and is of between 70 and 78, in particular 72.

* * * * *